(12) United States Patent
Kim et al.

(10) Patent No.: US 8,045,128 B2
(45) Date of Patent: Oct. 25, 2011

(54) BACKLIGHT UNIT AND DISPLAY DEVICE HAVING THE SAME

(75) Inventors: Kyeong-Min Kim, Cheonan-si (KR); Min-Gwan Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 12/200,561

(22) Filed: Aug. 28, 2008

(65) Prior Publication Data

US 2009/0185097 A1   Jul. 23, 2009

(30) Foreign Application Priority Data

Jan. 21, 2008   (KR) .................. 10-2008-0006267

(51) Int. Cl.
 *G02F 1/1333* (2006.01)
(52) U.S. Cl. .................. 349/158; 349/159; 349/160
(58) Field of Classification Search ........... 349/158–160
 See application file for complete search history.

(56) References Cited

U.S. PATENT DOCUMENTS

| 7,093,970 B2 * | 8/2006 | Jang ............... 362/632 |
| 7,483,092 B2 * | 1/2009 | Morsch ............ 349/58 |
| 2006/0125974 A1 * | 6/2006 | Fukayama et al. .... 349/58 |

* cited by examiner

*Primary Examiner* — Phu Vu
(74) *Attorney, Agent, or Firm* — F. Chau & Associates, LLC

(57) ABSTRACT

A backlight unit includes a light source, an optical member for adjusting a traveling path of light exiting from the light source, a frame accommodating and fixing the optical member and including a plane portion, a sidewall portion vertically extending from the plane portion and at least one frame fastening portion downwardly extending from the sidewall portion and a lower receiving member for accommodating and fixing the frame. The lower receiving member includes a bottom portion having at least one hole formed therein to be fastened to the frame fastening portion and a side surface portion upwardly extending from edges of the bottom portion.

8 Claims, 7 Drawing Sheets

130 (130a,130b,130c,130d)
430 (430a,430b,430c,430d)
440 (440a,440b,440c,440d)
1000 (100, 200, 300, 400, 500)
2100 (2100a, 2100b)
2430 (2430a,2430b,2430c,2430d)

130 (130a,130b,130c,130d)
430 (430a,430b,430c,430d)
440 (440a,440b,440c,440d)
1000 (100, 200, 300, 400, 500)
2100 (2100a, 2100b)
2430 (2430a,2430b,2430c,2430d)

BACKLIGHT UNIT AND DISPLAY DEVICE HAVING THE SAME

This application claims priority to Korean Patent application No. 10-2008-0006267, filed on Jan. 21, 2008, the disclosure of which is hereby incorporated by reference herein in its entirety.

BACKGROUND OF THE INVENTION

1. Technical Field

The present disclosure relates to a backlight unit and a display device having the same, and more particularly, to a backlight unit including a frame with a hook downwardly protruding therefrom to omit a screw coupling process, and a display device having the backlight unit.

2. Description of the Related Art

The range of applications in which a liquid crystal display (LCD) is being used has been extended because of its light-weight, thin, low-power drive, full color and high resolution characteristics. Currently, the LCD technology is being used in devices such as, for example, computers, notebook computers, PDAs, telephones, TVs, audio/video devices, and the like. With the LCD, a desired image is displayed on a LCD panel in which the amount of light to be transmitted is controlled according to video signals applied to a plurality of control switches arranged in a matrix form.

Unlike with a plasma display or the like, an LCD does not have a self light-emitting structure and thus needs a backlight unit having a light source. In addition, the backlight unit includes a variety of optical members for improving the quality of light exiting from the light source, and further includes a frame for fixing the light source and the optical members and a receiving member for accommodating and protecting the frame to which the light source and the optical members are fixed.

In a conventional backlight unit, protruding portions are formed on side surfaces of a frame, and holes corresponding to the protruding portions are formed in side surfaces of a receiving member, so that the frame with a light source and optical members fixed thereto is fixedly accommodated in the receiving member. Also, with the conventional backlight unit, since the frame cannot be securely coupled and fixed to the receiving member only by the protruding portions and the holes, screws are additionally used for the coupling. However, in such a coupling structure, in order to disassemble the backlight unit, the protruding portions of the frame fitted into the holes of the side surfaces of the receiving member should be pressed and pushed to the inside. In this case, the space between the inside of the frame and inside members such as a light guide plate and the like may be narrow and the flexibility of the protruding portions of the frame may be small, so that the working time may thereby be increased. In addition, when the conventional backlight unit is disassembled, additional working time may be required for loosening the additional screws used for the coupling in the backlight unit. Moreover, when the frame and the receiving member are coupled to each other, a part of the protruding portions may be worn away due to the friction between the protruding portions of the frame made of resin and the receiving member made of metal, thereby generating foreign materials. As a result, such foreign materials may infiltrate into the backlight unit and degrade the property of the backlight unit.

SUMMARY OF THE INVENTION

Exemplary embodiments of the present invention provide a backlight unit that can be readily assembled and disassembled, and a display device having the backlight unit.

Exemplary embodiments of the present invention provide a backlight unit, wherein foreign materials are not generated when a frame and a receiving member are coupled to each other, and a display device having the backlight unit.

In accordance with an exemplary embodiment of the present invention, a backlight unit is provided. The backlight unit includes a light source, an optical member for adjusting a traveling path of light exiting from the light source, a frame accommodating and fixing the optical member and including a plane portion, a sidewall portion vertically extending from the plane portion and at least one frame fastening portion downwardly extending from the sidewall portion and a lower receiving member for accommodating and fixing the frame. The lower receiving member includes a bottom portion having at least one hole formed therein to be fastened to the frame fastening portion and a side surface portion upwardly extending from edges of the bottom portion.

The frame may be formed in the shape of a quadrangular frame, and the frame fastening portion may be formed on the sidewall portion adjacent to an edge of the frame. In addition, the frame fastening portion may be formed in a corresponding portion of each of both opposite sidewalls of the sidewall portion of the frame. The lower receiving member may further include a lower receiving member fastening portion upwardly extending from the side surface portion.

At least a pair of the frame fastening portions may respectively extend from both the opposite sidewalls of the frame, and the lower receiving member may include at least a pair of the holes formed at positions corresponding to the at least pair of frame fastening portions. At this time, the protruding portions may inwardly protrude from the at least pair of frame fastening portions to face each other, and an internal distance between base portions of the at least pair of frame fastening portions may be no greater than an internal distance between the at least pair of holes formed in the lower receiving member. However, the exemplary embodiments of the present invention are not limited thereto. The protruding portions may outwardly protrude from the at least pair of frame fastening portions, and an external distance between base portions of the at least pair of frame fastening portions may be equal to or larger than an external distance between the at least pair of holes formed in the lower receiving member.

In addition, the backlight unit may further include a frame fastening portion upwardly extending from the sidewall portion. At this time, the frame fastening portion may include a hook, which may have a base portion with a predetermined length and a protruding portion protruding in a direction perpendicular to a longitudinal direction of the base portion.

According to another exemplary embodiment of the present invention, a display device is provided. The display device includes a display panel for displaying an image, a frame fixing the display panel and including a plane portion, a sidewall portion vertically extending from the plane portion, and a frame fastening portion downwardly extending from the sidewall portion and a lower receiving member formed with a hole to be fastened to the frame fastening portion to accommodate and fix the frame.

The display device may further include an upper receiving member supporting the display panel on the upper side thereof to be fastened to the frame. The frame may further include a frame fastening portion upwardly protruding therefrom, and the upper receiving member may include a hole formed at a position corresponding to the frame fastening portion protruding upwardly to be fastened to the frame fastening portion. Further, the upper receiving member may include a flat plate portion with an open central portion and sidewalls downwardly bent from edges of the flat plate portion, and the hole may be formed in the flat plate portion.

In accordance with an exemplary embodiment of the present invention, a display device is provided. The display device includes a display panel for displaying an image, a backlight unit supplying light to the display panel and including a lower receiving member having a lower receiving member fastening portion upwardly extending therefrom and an upper receiving member provided over the display panel and having an upper receiving member hole to be fastened to the lower receiving member fastening portion.

The lower receiving member may include a bottom portion and a side surface portion upwardly bent from edges of the bottom portion, wherein the lower receiving member fastening portion may be formed on an edge of the side surface portion. In addition, the lower receiving member may be formed in a quadrangular shape, and the lower receiving member fastening portion may be formed in a region adjacent to an edge of the lower receiving member. The lower receiving member fastening portion may be formed on each of both opposite side surface of the lower receiving member.

The backlight unit may include a light source; an optical member for adjusting a traveling path of light exiting from the light source; a frame accommodating and fixing the optical member and including a frame fastening portion downwardly protruding therefrom; and a lower receiving member having a hole formed at a position corresponding to the frame fastening portion. At this time, the frame may include a plane portion and a sidewall portion vertically extending from the plane portion, and the frame fastening portion may be formed on the sidewall portion. In addition, the display device may further include a frame fastening portion upwardly extending from the sidewall portion.

BRIEF DESCRIPTION OF THE DRAWINGS

Exemplary embodiments of the present invention can be understood in more detail from the following description taken in conjunction with the accompanying drawings, in which.

DETAILED DESCRIPTION OF EXEMPLARY EMBODIMENTS OF THE INVENTION

Figure 1:
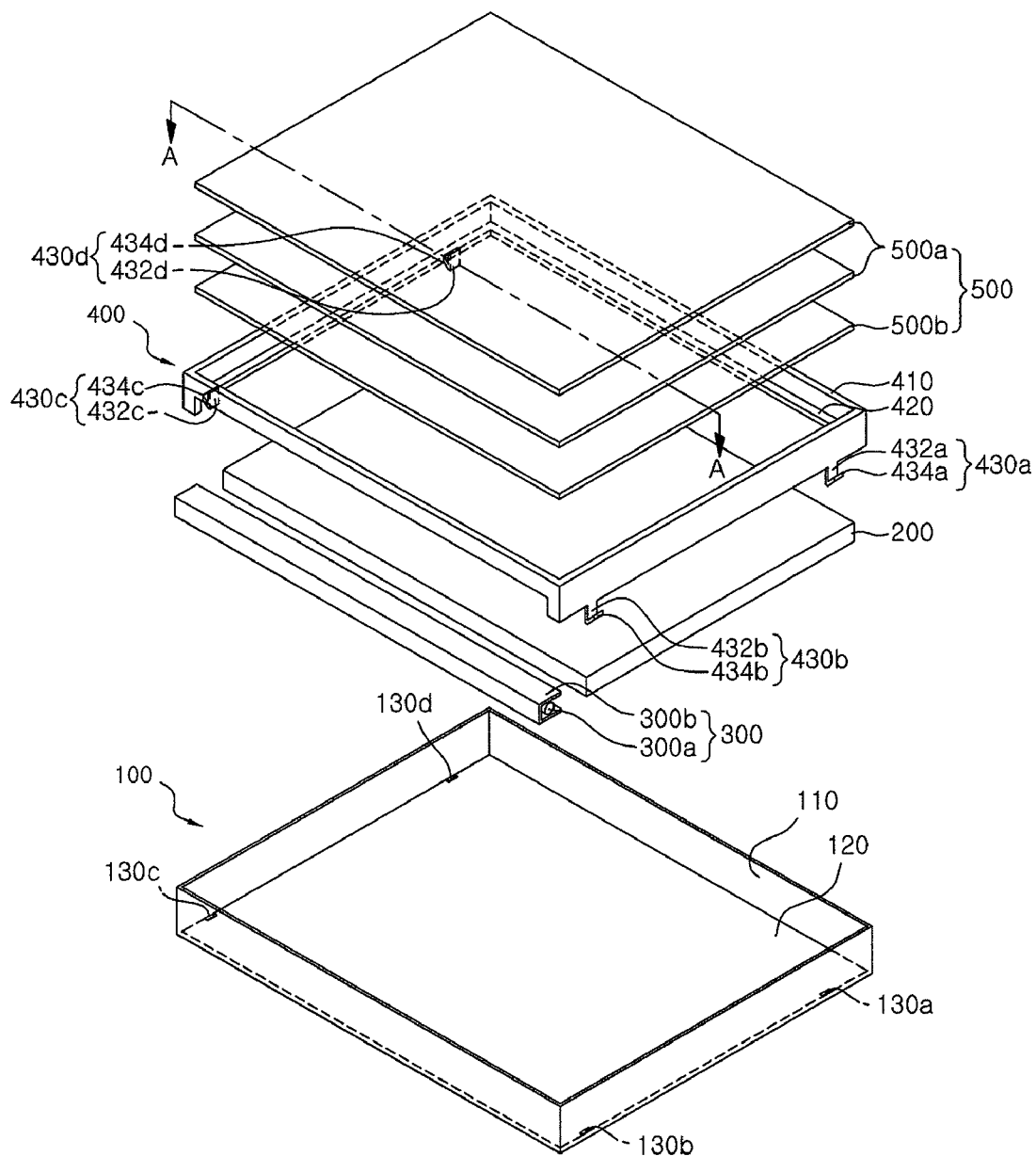
FIG. 1 is a schematic exploded perspective view of a backlight unit according to an exemplary embodiment the present invention.

Hereinafter, exemplary embodiments of the present invention will be described in detail with reference to the accompanying drawings.

However, the present invention is not limited to the exemplary embodiments but may be implemented into different forms. Throughout the drawings, like elements are designated by like reference numerals.

Figure 2:
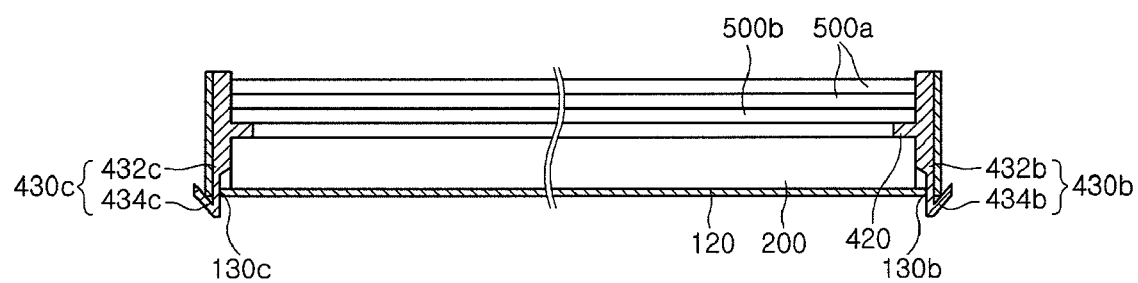
FIG. 2 is a sectional view taken along line A-A of FIG. 1.
Figure 3:
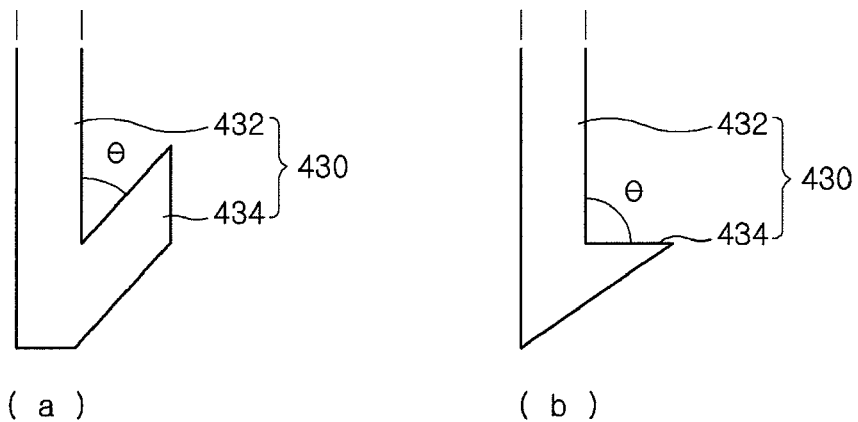
FIG. 3 is a side view of hooks according to an exemplary embodiment of the present invention.
Figure 4:
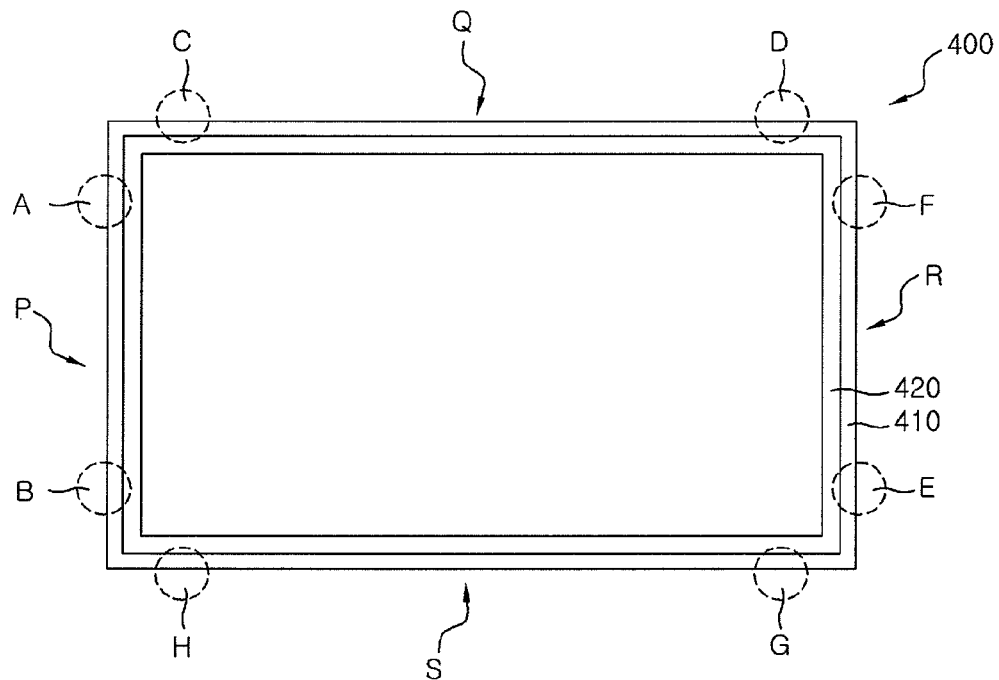
FIG. 4 is a plan view of a frame according to an exemplary embodiment of the present invention.
Figure 5A:
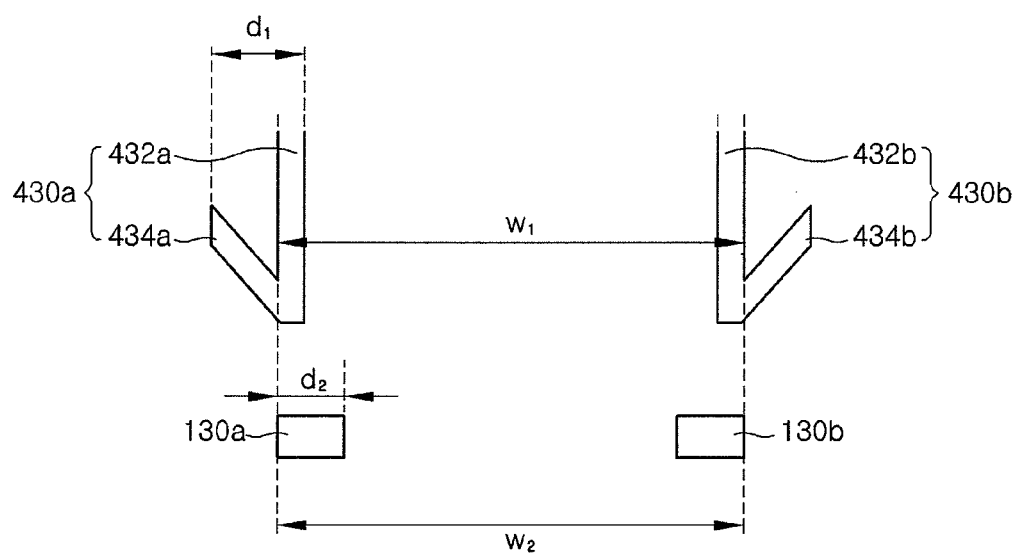
FIGS. 5A and 5B are side views illustrating a position relationship of protruding portions and holes.
Figure 5B:
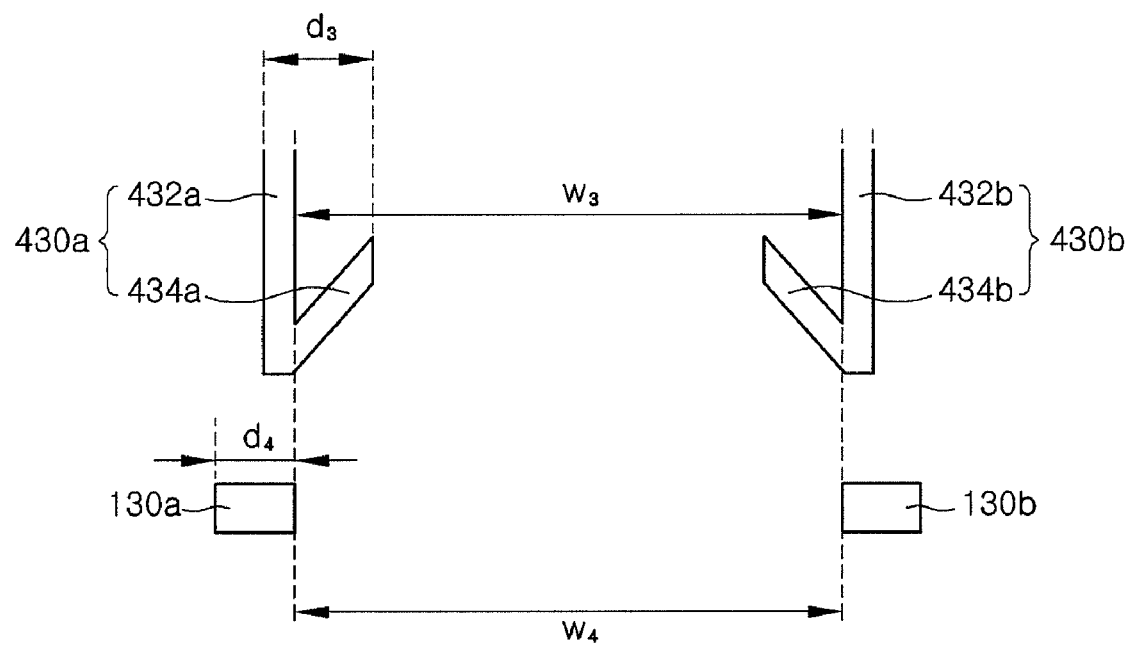

FIG. 1 is a schematic exploded perspective view of a backlight unit according to an exemplary embodiment the present invention, FIG. 2 is a sectional view taken along line A-A of FIG. 1, FIG. 3 is a side view of hooks according to an exemplary embodiment of the present invention, FIG. 4 is a plan view of a frame according to an exemplary embodiment of the present invention, and FIGS. 5A and 5B are side views illustrating position relationships of protruding portions and holes.

Referring to FIGS. 1 and 2, the backlight unit according to an exemplary embodiment of the present invention includes a light source unit 300 for generating light, a light guide plate 200 for converting light generated in and exiting from the light source unit 300 into light having an optical distribution in the form of a surface light source, an optical member 500 for improving the quality of light exiting from the light guide plate 200, a frame 400 for accommodating and fixing the light source unit 300, the light guide plate 200 and the optical member 500, and a lower receiving member 100 for accommodating and protecting the frame 400 accommodating and fixing the lightsource unit 300, the light guide plate 200 and the optical member 500.

The light source unit 300 may convert electric energy applied from a power source into light energy, and is preferably positioned at a side surface of the light guide plate 200. In this embodiment, the light source unit 300 includes a lamp 300a, and a lamp cover 300b for reflecting light, which exits from the lamp 300a to a portion other than a light incident surface of the light guide plate 200, to cause the light to be incident on the light incident surface of the light guide plate 200.

A variety of light sources may be employed in the light source unit 300 according to the present invention. In this embodiment, a cold cathode fluorescent lamp (CCFL) is used as an example of the light source. The CCFL may include, for example, a glass tube, an inert gas injected into the glass tube, and anode and cathode electrodes installed at both ends of the glass tube. Here, a phosphor is applied to an inner wall of the glass tube, and excited by ultraviolet light emitted from the inert gas, thereby emitting visible light to the outside.

The lamp cover 300b may reflect light which has not exited to a light exiting region of the lamp cover 300b among the light emitted from the lamp 300a and re-emit the light to the light exiting region, and is preferably formed to surround the lamp 300a. In this embodiment, the lamp cover 300b is preferably formed in the shape of '[' so that light emitted from the lamp 300a can be incident on the light incident surface of the light guide plate 200. The lamp cover 300b is not limited thereto but may be formed in various shapes, such as, for example, a round shape.

The optical member 500 may improve the quality and efficiency by adjusting a traveling path of light emitted from the light source unit 300. In this embodiment, the optical member 500 may include a diffusion sheet 500b and a prism sheet 500a. In addition, the optical member 500 may further include a reflection sheet in addition to the diffusion sheet 500b and the prism sheet 500a.

The diffusion sheet 500b uniformly diffuses light emitted from the light source unit 300 and transfers the light in a front direction of the prism sheet 500a and a liquid crystal display (LCD) panel which will be described later, thereby widening a viewing angle and reducing diffusion of bright defects, bright lines, spots and the like. The diffusion sheet 500b is preferably positioned over the light guide plate 200.

The prism sheet 500a may increase the luminance by refracting and condensing light exiting from the diffusion sheet 500b and cause the light to be incident on the LCD panel. To this end, the prism sheet 500a is preferably positioned between the diffusion sheet 500b and the LCD panel.

The reflection sheet may reflect light discharged to a lower surface of the light guide plate 200 and cause the light to be incident on the LCD panel, and may be positioned under the light guide plate 200.

The lower receiving member 100 is formed in the shape of a rectangular hexahedral box with an open top face and has a receiving space with a predetermined depth defined therein. The lower receiving member 100 may include a bottom portion 120, and a side surface portion 110 upwardly extending from respective edges of the bottom portion 120. In this embodiment, the lower receiving member 100 is formed with lower receiving member holes 130 fastened to frame hooks 430.

The lower receiving member holes 130 are preferably formed at positions corresponding to the frame hooks 430. In this embodiment, the lower receiving member holes 130 are formed in both side edge portions of the bottom portion. The lower receiving member holes 130 may include first to fourth holes 130a, 130b, 130c and 130d formed at positions corresponding to first to fourth frame hooks 430a, 430b, 430c and 430d. In this embodiment, although the first to fourth holes 130a, 130b, 130c and 130d are formed in the lower receiving member 100 corresponding to the first to fourth frame hooks 430a, 430b, 430c and 430d, the number of the lower receiving member holes 130 of the lower receiving member 100 may be increased or decreased depending on the number of the frame hooks 430. At this time, the number of the lower receiving member holes 130 formed in the lower receiving member 100 may be greater than the number of the frame hooks 430. However, the frame hooks 430 and the lower receiving member holes 130 are preferably the same in number. In addition, the shape of the lower receiving member holes 130 is preferably determined so that the frame hooks 430 can be inserted and then fastened thereto. In this embodiment, it is preferred that the lower receiving member holes 130 are formed in a quadrangular shape.

The frame 400 is to accommodate the light source unit 300, the light guide plate 200 and the optical member 500 therein and to fix them to the lower receiving member 100. The frame 400 may be formed, for example, in the shape of a quadrangular frame and include a plane portion 420, a sidewall portion 410 vertically extending therefrom, and fastening portions protruding from the sidewall portion 410, e.g., the frame hooks 430. Moreover, a seating portion may be formed on the plane portion 420 so that the LCD panel can be seated thereon. The seating portion may include fixing protrusions for aligning and positioning the LCD panel by being in contact with edge side surfaces thereof, or predetermined stepped projection surfaces.

The frame hooks 430 may fix the frame 400 to the lower receiving member 100. In this embodiment, the frame hooks 430 may include the first to fourth frame hooks 430a, 430b, 430c and 430d. Each of the first to fourth frame hooks 430a, 430b, 430c and 430d may include a plate-shaped base portion 432 downwardly extending from the frame 400 with a predetermined depth, and a protruding portion 434 protruding from the base portion 432 in a direction crossing a longitudinal direction of the base portion 432, e.g., a horizontal direction. In addition, the first to fourth frame hooks 430a, 430b, 430c and 430d may include first to fourth base portions 432a, 432b, 432c and 432d and first to fourth protruding portions 434a, 434b, 434c and 434d, respectively. At this time, the maximum width of the protruding portion 434 is preferably larger than that of the base portion 432 so that the frame hook 430 can be coupled and fixed to the lower receiving member hole 130 of the lower receiving member 100. Moreover, a distal end of the protruding portion 434 is preferably narrower than a proximal end thereof so that the frame hook 430 with the protruding portion 434 formed thereon can be readily fitted into the lower receiving member hole 130. It is preferable to reduce the area of the distal end of the protruding portion 434 brought into contact with the lower receiving member hole 130 to be coupled thereto. For example, the protruding portion 434 may be formed in a triangular shape with a narrow distal end, and the distal end may be formed in a round shape. Further, in this embodiment, although the first to fourth base portions 432a, 432b, 432c and 432d are formed in the shape of a plate, they are not limited thereto. The first to fourth base portions 432a, 432b, 432c and 432d may be formed, for example, in the shape of a cylinder, elliptical cylinder and polygonal cylinder as well as the plate. That is, the first to fourth base portions 432a, 432b, 432c and 432d according to exemplary embodiments of the present invention may be formed in any shape if they protrude from the frame 400 and can be coupled to the lower receiving member holes 130.

Meanwhile, in this embodiment, as shown in FIG. 3(a), each protruding portion 434 is formed in the shape of a bent hook, so that the frame hooks 430 surround the lower receiving member 100 to thereby enhance a fastening force between the frame 400 and the lower receiving member 100. However, the protruding portions 434 are not limited thereto, but may be formed in various shapes without departing from the technical spirit of exemplary embodiments of the present invention. For example, as shown in FIG. 3(b), the protruding portion 434 may be formed in a triangular shape. At this time, an angle $\theta$ defined by the base portion 432 and the protruding portion 434 is preferably below a right angle so as to prevent the protruding portion 434 from sliding in the lower receiving member hole 130 of the lower receiving member 100. Moreover, in this embodiment, the protruding portions 434 formed in the frame hooks 430 outwardly protrude from the frame hooks 430, respectively. However, the protruding portions 434 are not limited thereto, but may inwardly protrude from the frame hooks 430, respectively.

In addition, referring to FIG. 4, the frame hooks 430 are preferably formed on the frame 400 mirror-symmetrically, thereby preventing a region of the frame 400 and the lower receiving member 100 from getting loose. That is, if the first and second frame hooks 430a and 430b are formed on a first sidewall P of the frame 400, the third and fourth frame hooks 430c and 430d are preferably formed on a third sidewall R opposite to the first sidewall P, thereby preventing a region from getting loose when the frame 400 and the lower receiving member 100 are fastened to each other. In the meantime, if the first and second frame hooks 430a and 430b are formed on a second sidewall Q of the frame 400, the third and fourth frame hooks 430c and 430d are preferably formed on a fourth sidewall S. Moreover, to securely fasten the frame 400 and the lower receiving member 100, it is preferred that the frame hooks 430 are formed on edges of the sidewalls than on central portions thereof with respect to a longitudinal direction.

Further, the first to fourth frame hooks 430a, 430b, 430c and 430d are preferably formed mirror-symmetrically in pairs in the sidewall portion. For example, the first to fourth frame hooks 430a, 430b, 430c and 430d are preferably formed adjacent to bent regions of the first to fourth sidewalls P, Q, R and S. For example, in a case where the first and second frame hooks 430a and 430b are formed on the first sidewall P and the third and fourth frame hooks 430c and 430d are formed on the third sidewall R, it is preferable that the first and second frame hooks 430a and 430b be formed on both sides A and B of the first sidewall P and that the third and fourth frame hooks 430c and 430d be formed on both sides E and F of the third sidewall R, respectively. In a case where the first and second frame hooks 430a and 430b are formed on the second sidewall Q and where the third and fourth frame hooks 430c and 430d are formed on the fourth sidewall S, it is preferable that the first and second frame hooks 430a and 430b be formed on both sides C and D of the second sidewall Q and the third and fourth frame hooks 430c and 430d be formed on both sides G and H of the fourth sidewall S, respectively.

Although in this embodiment, the first to fourth frame hooks 430a, 430b, 430c and 430d, e.g., the four frame hooks 430 are formed on both opposite sidewalls of the frame 400, the exemplary embodiments of the present invention are not limited thereto. The number of the frame hooks 430 according to exemplary embodiments of the present invention may be less or greater than four. That is, as the frame hooks 430 are intended to securely couple the frame 400 to the lower receiving member 100, the number of the frame hooks 430 may be changed as desired.

In the aforementioned structure of an exemplary embodiment of the present invention, the protruding portion 434 is bent due to tension, and thus, the frame hook 430 is inserted into the lower receiving member hole 130. In addition, after the frame hook 430 is inserted into the lower receiving member hole 130, the protruding portion 434 is restored due to the tension, and thus, the frame hook 430 is coupled to the lower receiving member hole 130. Moreover, the protruding portions 434 of the frame hooks 430 are preferably formed in opposite directions, so that the tensions of the frame hooks 430 are also applied in opposite directions. Accordingly, the frame hooks 430 are strongly contacted with and coupled to the lower receiving member 100 due to the tension, thereby securing the coupling of the frame 400 and the lower receiving member 100.

FIG. 5A illustrates a case where the first and second protruding portions 434a and 434b are formed to outwardly protrude from the first frame hook 430a and the second frame hook 430b, respectively. As shown in FIG. 5A, when it is assumed that an external distance between the first base portion 432a and the second base portion 432b is $W_1$ and an external distance between the first hole 130a and the second hole 130b formed in the lower receiving member 100 is $W_2$, $W_1$ should be equal to or slightly larger than $W_2$.

FIG. 5B illustrates a case where the first and second protruding portions 434a and 434b are formed to inwardly protrude from the first frame hook 430a and the second frame hook 430b, respectively. In such a case, when it is assumed that an internal distance between the first base portion 432a and the second base portion 432b is $W_3$ and that an internal distance between the first hole 130a and the second hole 130b formed in the lower receiving member 100 is $W_4$, $W_3$ should be equal to or slightly smaller than $W_4$.

In both the cases, widths $d_2$ and $d_4$ of the first and second holes should be equal to or smaller than widths $d_1$ and $d_3$ of the first and second protruding portions 434a and 434b so that the first and second frame hooks 430a and 430b are respectively coupled to the first and second holes 130a and 130b. That is, when the frame hooks 430 are forcibly fastened to the lower receiving member holes 130, an appropriate fastening force can be provided by adjusting the distance between the first and second frame hooks 430a and 430b and the distance between the first and second holes 130a and 130b.

As described above, according to exemplary embodiments of the present invention, the frame hooks 430 are provided to downwardly protrude from the frame 400, and the lower receiving member holes 130 are formed in the bottom surface of the lower receiving member 100 corresponding to the frame hooks 430, so that the frame 400 and the lower receiving member 100 are fastened to each other and the sufficient fastening force can be obtained without coupling screws. In addition, according to exemplary embodiments of the present invention, as the frame hooks 430 are formed under the frame 400, when the frame 400 and the lower receiving member 100 are fastened to each other, the frame hooks 430 do not scratch the lower receiving member 100 to thereby minimize the generation of foreign materials. Moreover, according to exemplary embodiments of the present invention, when the backlight unit is assembled, the frame hooks 430 apply pressure to the lower receiving member holes 130 and are thus coupled thereto, thereby reducing assembly time. Further, according to exemplary embodiment of the present invention, when the backlight unit is disassembled, the frame 400 and the lower receiving member 100 can be readily separated from each other by pressing the frame hooks 430 in an opposite direction to the tension, thereby reducing disassembly time.

Meanwhile, in this exemplary embodiment, the light source unit 300 has been described as an example of an edge-type light source positioned at the side surface of the light guide plate 200. Among the edge-type light sources, the light source unit 300 including the lamp 300a and the lamp cover 300b has been explained as an example. However, the light source unit 300 is not limited thereto, but may include, for example, one or more light emitting diodes (LEDs) and a printed circuit board (PCB) having the LEDs mounted thereon to generate light. Moreover, exemplary embodiments of the present invention can be applied to a direct-type light source, which is positioned not at the side surface of the light guide plate 200 but below the optical member 500. In this case, the light source may include one or more lamps or one or more LEDs.

Next, an LCD according to a first exemplary embodiment of the present invention, wherein frame hooks are employed in coupling of an upper receiving member and a frame, will be described with reference to the accompanying drawings. Descriptions overlapping with those of the previous embodiment will be omitted or briefly explained.

Figure 6:
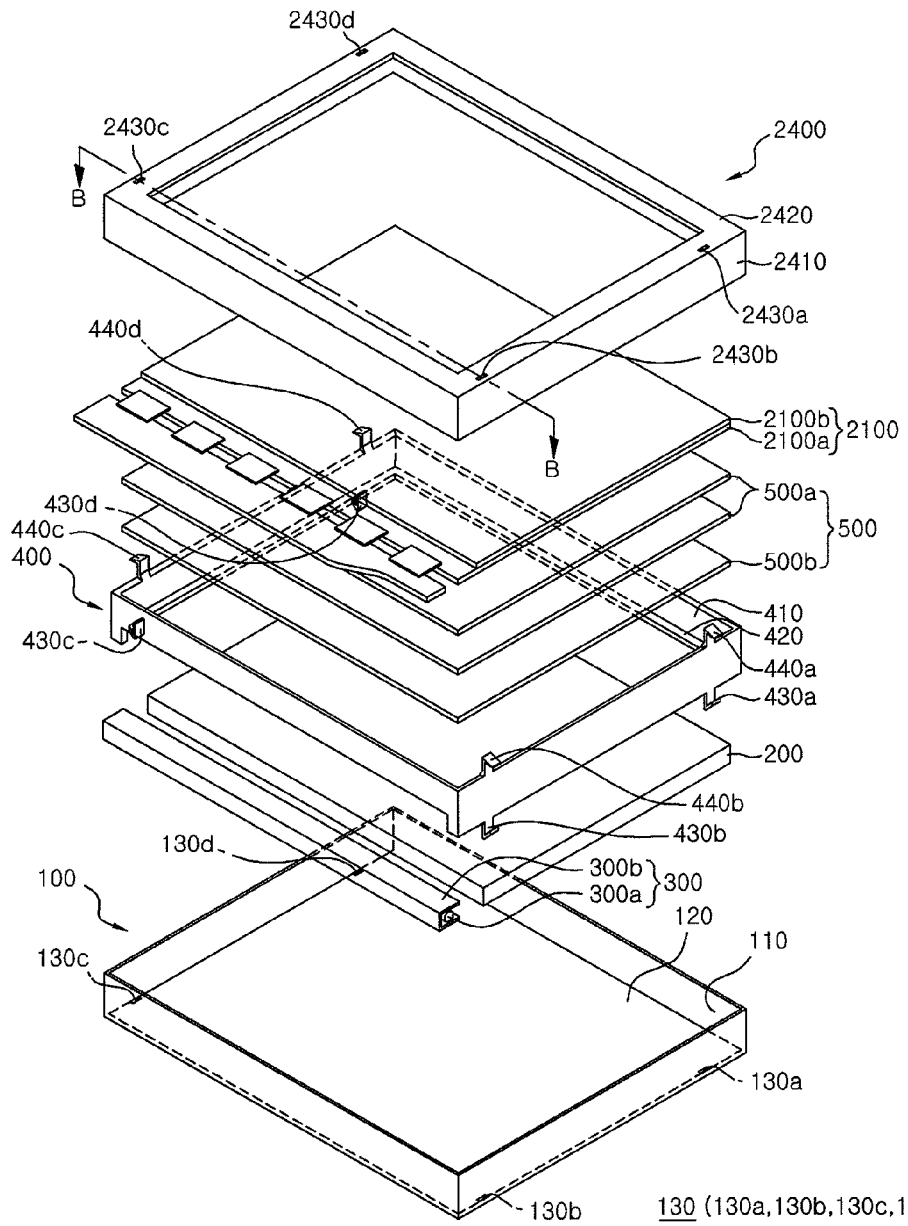
FIG. 6 is a schematic exploded perspective view of a liquid crystal display according to an exemplary embodiment of the present invention.
Figure 7:
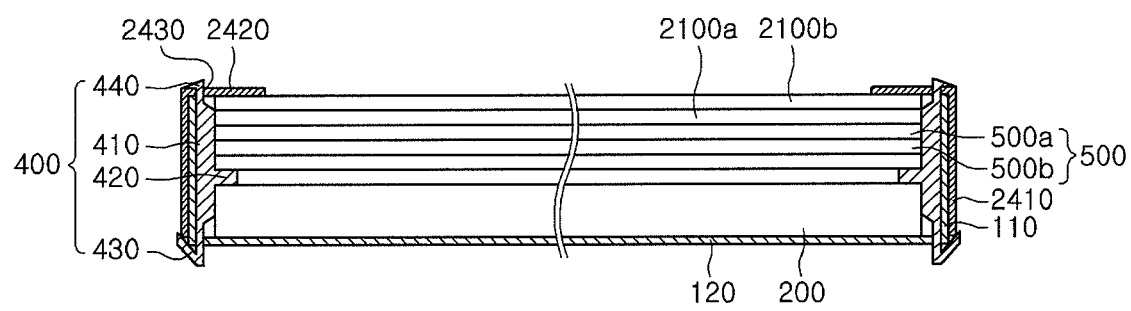
FIG. 7 is a sectional view taken along line B-B of FIG. 6.

FIG. 6 is a schematic exploded perspective view of an LCD according to the first exemplary embodiment of the present invention, and FIG. 7 is a sectional view taken along line B-B of FIG. 6.

As shown in FIGS. 6 and 7, the LCD according to the first exemplary embodiment of the present invention includes an LCD panel 2100 for displaying an image, a backlight unit 1000 for supplying light to the LCD panel 2100, and an upper receiving member 2400 for protecting the LCD panel 2100.

The LCD panel 2100 includes a thin film transistor (TFT) substrate 2100a, a color filter substrate 2100b corresponding to the TFT substrate 2100a, and a liquid crystal layer interposed between the TFT substrate 2100a and the color filter substrate 2100b. Moreover, the LCD panel 2100 may further include polarization plates formed over the color filter substrate 2100b and under the TFT substrate 2100a corresponding to each other.

The TFT substrate 2100a is a transparent glass substrate on which TFTs and pixel electrodes are arranged in a matrix form. Data lines may be connected to source terminals of the TFTs, and gate lines may be connected to gate terminals thereof. In addition, pixel electrodes, which are transparent electrodes made of a transparent conductive material, may be connected to drain terminals thereof. When electrical signals are input into the data lines and the gate lines, the respective TFTs are turned on or off, so that the electrical signals required for formation of pixels are applied to the drain terminals.

The color filter substrate 2100*b* is a substrate having R, G and B pixels, which are color pixels expressing predetermined colors when light passes therethrough, formed by means of a thin film process. A common electrode, which is a transparent conductive thin film made of a transparent conductor such as, for example, indium tin oxide (ITO) or indium zinc oxide (IZO), may be formed on the entire surface of the color filter substrate 2100*b*.

As described above, when the TFT is turned on by applying power to the gate terminal and the source terminal of the TFT substrate 2100*a*, an electric field is generated between the pixel electrode and the common electrode of the color filter substrate 2100*b*. The arrangement of the liquid crystal injected between the TFT substrate 2100*a* and the color filter substrate 2100*b* is changed by the electric field. The light transmissivity is changed according to a change of the liquid crystal arrangement, to thereby obtain a desired image.

The backlight unit 1000 includes a light source unit 300 for generating light, a light guide plate 200 for converting light generated in and exiting from the light source unit 300 into light having an optical distribution in the form of a surface light source, an optical member 500 for improving the quality of light exiting from the light guide plate 200, a frame 400 for accommodating and fixing the light source unit 300, the light guide plate 200 and the optical member 500, and a lower receiving member 100 for accommodating and protecting the frame 400 accommodating and fixing the light source unit 300, the light guide plate 200 and the optical member 500.

The frame 400 is to accommodate the light source unit 300, the light guide plate 200 and the optical member 500 therein and to fix them to the lower receiving member 100. Like the aforementioned previous embodiment, the frame 400 may be formed in the shape of a quadrangular frame and may include a plane portion 420, a sidewall portion 410 vertically extending therefrom, and frame hooks 430 protruding from the sidewall portion 410.

The frame hooks 430 are to fix the frame 400 to the lower receiving member 100. In this embodiment, first to fourth frame hooks 430*a*, 430*b*, 430*c* and 430*d* may be formed to downwardly protrude from the frame 400 as in the previous embodiment, and fifth to eighth frame hooks 440*a*, 440*b*, 440*c* and 440*d* may be formed to upwardly protrude from the frame 400. In addition, each of the first to eighth frame hooks 430*a*, 430*b*, 430*c*, 430*d*, 440*a*, 440*b*, 440*c* and 440*d* may include, for example, a plate-shaped base portion and a protruding portion protruding from the base portion. The first to eighth frame hooks 430*a*, 430*b*, 430*c*, 430*d*, 440*a*, 440*b*, 440*c* and 440*d* may include first to eighth base portions and first to eighth protruding portions.

At this time, the protruding portions 434 (see FIG. 3) are preferably formed to cross the longitudinal directions of the base portions 432 (see FIG. 3) so that the first to eighth frame hooks 430*a*, 430*b*, 430*c*, 430*d*, 440*a*, 440*b*, 440*c* and 440*d* can be coupled and fixed to upper receiving member holes 2430 and lower receiving member holes 130. In addition, distal ends of the protruding portions are preferably narrower than proximal ends thereof so that the frame hooks 430 and 440 with the protruding portions formed thereon can be easily coupled to the upper receiving member holes 2430 and the lower receiving member holes 130. It is also preferable to reduce the area of the distal ends of the protruding portions, which are brought into contact with the upper receiving member holes 2430 and the lower receiving member holes 130 to be coupled thereto.

The lower receiving member 100 is formed in the shape of a rectangular hexahedral box with an open top face and has a receiving space with a predetermined depth defined therein. The lower receiving member 100 may include a bottom portion 120, and a side surface portion 110 upwardly extending from respective edges of the bottom portion 120. In this embodiment, the lower receiving member holes 130 are formed in the lower receiving member 100 to be fastened to the frame hooks 430 as in the previous embodiment.

The lower receiving member holes 130 are preferably formed at positions corresponding to the frame hooks 430. In this embodiment, the lower receiving member holes 130 are formed in both side edge portions of the bottom portion 120. The lower receiving member holes 130 may include first to fourth lower receiving member holes 130*a*, 130*b*, 130*c* and 130*d* formed at positions corresponding to the first to fourth frame hooks 430*a*, 430*b*, 430*c* and 430*d*. However, the number of the lower receiving member holes 130 may be increased or decreased according to the number of the frame hooks.

The upper receiving member 2400 is provided over the LCD panel 2100 to protect the LCD panel 2100, and includes a flat plate portion 2420 with an open center portion so that a user can see an image of the LCD panel 2100 and sidewalls 2410 downwardly bent from the flat plate portion 2420. In addition, first to fourth upper receiving member holes 2430*a*, 2430*b*, 2430*c* and 2430*d* are formed in the flat plate portion 2420 of the upper receiving member 2400 to be coupled to the fifth to eighth frame hooks 440*a*, 440*b*, 440*c* and 440*d* upwardly protruding from the frame 400. At this time, the first to fourth upper receiving member holes 2430*a*, 2430*b*, 2430*c* and 2430*d* are preferably formed at portions corresponding to the positions of the fifth to eighth frame hooks 440*a*, 440*b*, 440*c* and 440*d* to be coupled thereto.

As set forth herein, according to the embodiment of the present invention, the frame hooks 430 and 440 are formed on the frame 400 to upwardly and downwardly protrude therefrom, so that the frame 400 can be securely fastened to the upper and lower receiving members 2400 and 100 without coupling screws. In addition, according to the embodiment of the present invention, as the frame hooks 430 and 440 protrude in the up and down directions of the frame 400, when the LCD is assembled, the friction between the frame hooks 430 and 440 and the upper and lower receiving members 2400 and 100 can be minimized, so that foreign materials generated due to the wear of the frame hooks 430 and 440 can be minimized.

Next, an LCD according to a second exemplary embodiment of the present invention, wherein hooks are formed on a lower receiving member, will be described with reference to the accompanying drawings. Descriptions overlapping with those of the previous embodiments will be omitted or briefly explained.

Figure 8:
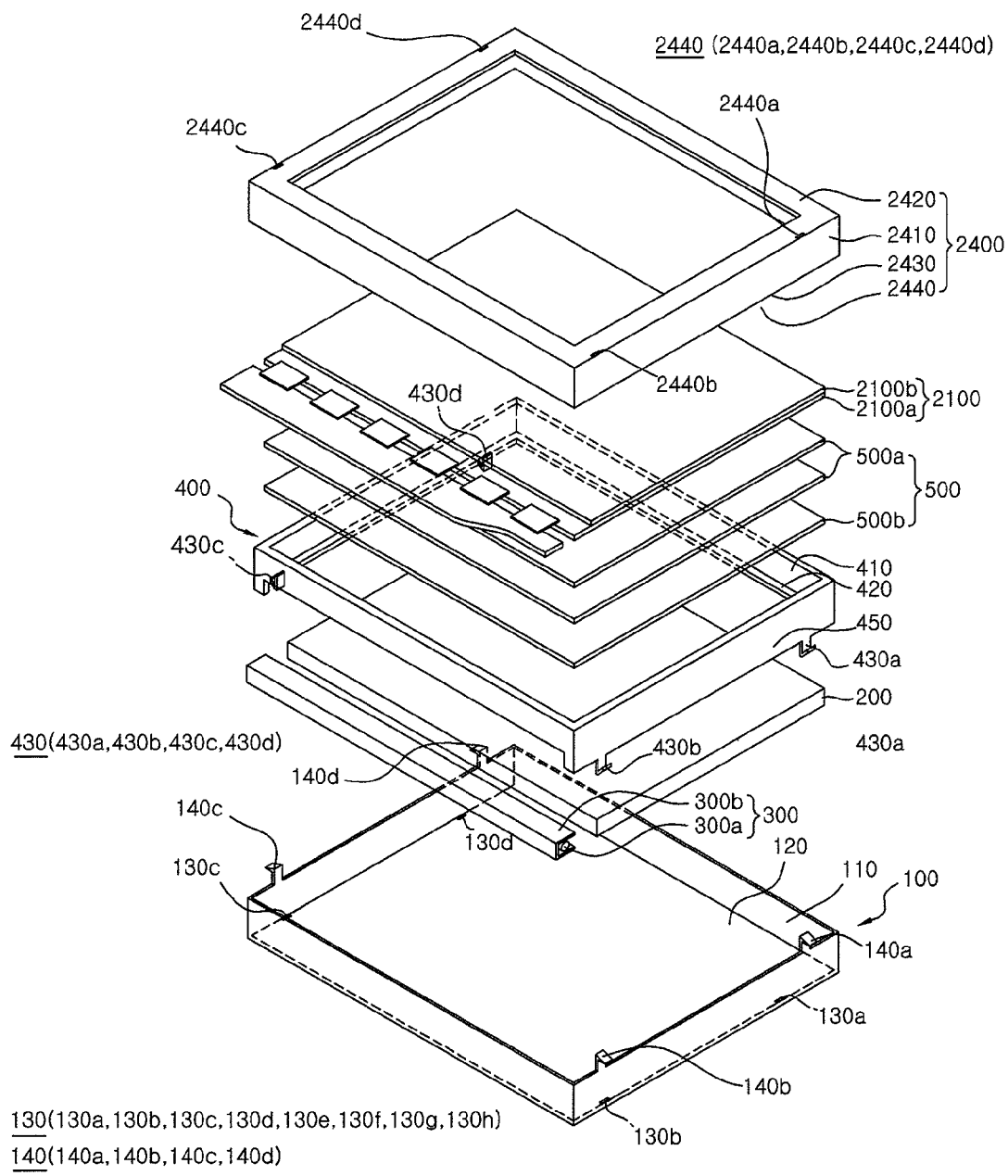
FIG. 8 is a schematic exploded perspective view of a liquid crystal display according to an exemplary embodiment of the present invention.

FIG. 8 is a schematic exploded perspective view of the LCD according to the second exemplary embodiment of the present invention.

Referring to FIG. 8, the LCD according to the second exemplary embodiment of the present invention includes a LCD panel 2100 for displaying an image, a backlight unit 1000 for supplying light to the LCD panel 2100, and an upper receiving member 2400 for protecting the LCD panel 2100. In the LCD according to this embodiment, a frame 400 with frame hooks 430 downwardly protruding therefrom and a lower receiving member 100 with lower receiving member holes 130 formed therein can be coupled to each other as in the previous embodiments.

The upper receiving member 2400 according to this embodiment includes a flat plate portion 2420, sidewalls 2410 downwardly bent from the flat plate portion 2420, and upper receiving member holes 2440 formed in the flat plate portion 2420. When the LCD panel 2100 and the backlight unit 1000 are coupled to each other in an assembly process of the LCD, the flat plate portion 2420 supports an upper portion of the LCD panel 2100 to protect edges of the LCD panel 2100 and to prevent the LCD panel 2100 from escaping. The flat plate portion 2420 is generally manufactured in the shape of a quadrangular plate like the LCD panel 2100, and a central portion thereof is open in a quadrangular shape like the LCD panel 2100 for a user to see an image displayed on the LCD panel 2100.

The sidewalls 2410 downwardly protrude from edges of the flat plate portion 2420 to surround side surfaces of the lower receiving member 100, thereby allowing the LCD panel 2100 to be securely accommodated therein.

In the LCD according to this embodiment, first to fourth upper receiving member holes 2440a, 2440b, 2440c and 2440d are formed in the flat plate portion 2420 of the upper receiving member 2400 to be coupled to first to fourth lower receiving member hooks 140a, 140b, 140c and 140d upwardly protruding from the lower receiving member 100. Here, the first to fourth upper receiving member holes 2440a, 2440b, 2440c and 2440d are preferably formed at portions corresponding to positions of the first to fourth lower receiving member hooks 140a, 140b, 140c and 140d to be coupled thereto.

The lower receiving member 100 may be formed in a quadrangular shape, e.g., in the shape of a rectangular hexahedral box with an open top face, and have a receiving space with a predetermined depth defined therein. The lower receiving member 100 may include a bottom portion 120, and a side surface portion 110 upwardly extending from respective edges of the bottom portion 120. In this embodiment, the lower receiving member holes 130 are formed in the lower receiving member 100 to be fastened to the frame hooks 430 as in the previous embodiments. Moreover, the four lower receiving member hooks 140 are formed on the lower receiving member 100 to be coupled to the four upper receiving member holes 2440, and preferably formed to upwardly extend from edges of the side surface portion 110. At this time, it is preferred that the lower receiving member hooks 140 are respectively formed on both opposite side surfaces of the lower receiving member 100. However, the lower receiving member hooks 140 are not limited thereto, but may be formed, for example, on the entire side surface portion 110 of the lower receiving member 100.

As described above, in the LCD according to this embodiment, the lower receiving member hooks 140 are formed on the lower receiving member 100 to upwardly protrude therefrom, so that the upper receiving member 2400 with the upper receiving member holes 2440 formed therein and the lower receiving member 100 can be fastened to each other. Therefore, when the upper receiving member 2400 and the lower receiving member 100 are assembled and disassembled, the working time can be reduced.

According to exemplary embodiments of the present invention, a backlight unit may be provided, wherein frame hooks downwardly protruding from a frame and holes formed in a lower receiving member are provided for readily assembling and disassembling the frame and the lower receiving member, and an LCD having the backlight unit.

In addition, exemplary embodiments of the present invention may provide a backlight unit, wherein frame hooks downwardly protruding from a frame are provided to minimize friction between a lower receiving member and the frame hook and the generation of foreign materials, and an LCD having the backlight unit.

Moreover, according to exemplary embodiments of the present invention, a backlight unit may be provided, in which frame hooks upwardly protruding from a frame and holes formed in an upper receiving member are provided for readily assembling and disassembling the frame and the upper receiving member, and an LCD having the backlight unit.

Further, exemplary embodiments of the present invention may provide a backlight unit, wherein lower receiving member hooks upwardly protruding from a lower receiving member and holes formed in an upper receiving member are provided for readily assembling and disassembling the upper receiving member and the lower receiving member, and an LCD having the backlight unit.

In the meantime, although the LCD has been explained by way of example in the foregoing embodiments, exemplary embodiments of the present invention are not limited thereto, but may be applied to all types of display devices having a frame and a receiving member provided therein.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A display device, comprising:
a display panel for displaying an image;
a frame fixing the display panel and including a plane portion, a sidewall portion vertically extending from the plane portion, first fastening portion integrally formed with the frame and downwardly protruding from the sidewall portion and a second fastening portion integrally formed with the frame and upwardly protruding from the sidewall portion;
a lower receiving member formed with a first hole to be fastened to the first fastening portion to accommodate and fix the frame; and
an upper receiving member supporting the display panel on the upper side thereof to be fastened to the frame, the upper receiving member comprising a second hole formed at a position corresponding to the second fastening portion to be fastened to the second fastening portion,
wherein the first fastening portion and the second fastening portion couple to the first hole and the second hole, respectively, by hook coupling.

2. The display device as claimed in claim 1, wherein the upper receiving member comprises a flat plate portion with an open central portion and sidewalls downwardly bent from edges of the flat plate portion, and the second hole is formed in the flat plate portion.

3. A display device, comprising:
a display panel for displaying an image;
a backlight unit supplying light to the display panel, wherein the backlight unit comprises:
a light source;
an optical member for adjusting a traveling path of light exiting from the light source;

a frame accommodating and fixing the optical member and including a frame fastening portion integrally formed with the frame and downwardly protruding therefrom; and a lower receiving member having a lower receiving member fastening portion integrally formed with the lower receiving member and upwardly protruding therefrom and a lower receiving member hole formed in the lower receiving member at a position corresponding to the frame fastening portion, wherein the frame fastening portion couples to the lower receiving member hole by hook coupling; and an upper receiving member provided over the display panel and having an upper receiving member hole to be fastened to the lower receiving member fastening portion, wherein the lower receiving member fastening portion couples to the upper receiving member hole by hook coupling.

4. The display device as claimed in claim 3, wherein the lower receiving member comprises a bottom portion and a side surface portion upwardly bent from edges of the bottom portion, the lower receiving member fastening portion being formed on an edge of the side surface portion.

5. The display device as claimed in claim 4, wherein the lower receiving member is formed in a quadrangular shape, and the lower receiving member fastening portion is formed in a region adjacent to an edge of the lower receiving member.

6. The display device as claimed in claim 5, wherein the lower receiving member fastening portion is formed on each of both opposite side surface of the lower receiving member.

7. The display device as claimed in claim 3, wherein the frame comprises a plane portion and a sidewall portion vertically extending from the plane portion, and the frame fastening portion is formed on the sidewall portion.

8. The display device as claimed in claim 7, further comprising an additional frame fastening portion integrally formed with the frame and upwardly protruding from the sidewall portion.

* * * * *